UNITED STATES PATENT OFFICE.

STEPHEN L. GOODALE, OF SACO, MAINE.

IMPROVEMENT IN FOOD EXTRACTS FROM THE JUICE OF FISH.

Specification forming part of Letters Patent No. 171,662, dated January 4, 1876; application filed October 18, 1875.

*To all whom it may concern:*

Be it known that I, STEPHEN L. GOODALE, of Saco, in the county of York and State of Maine, chemist, have invented certain new and useful Improvements in the Manufacture of Food Extracts; and I do hereby declare that the following is a full, clear, and exact description thereof, which will enable others skilled in the art to which it pertains to make and use the same, reference being had to the accompanying drawings and to the letters of reference marked thereon, which form a part of this specification.

My invention or discovery consists in the preparation of an extract from the juices of fish, which contains in a concentrated form the organic and saline constituents contained in said juices. From these juices I prepare an extract, which, in some important respects, resembles that prepared from the juices of the ox and other land animals, and which, like it, possesses highly stimulating and nutritive properties.

My invention further consists in the utilization of a by-product of the fisheries, which has hitherto run to waste—namely, the watery liquid which drains from or is pressed out of fish which have been cooked for the purpose of separating and obtaining the oil and solid matter, known as "chum" or "scrap," contained therein, which liquid consists chiefly of the juices of fish, more or less diluted with water, and is capable of furnishing material for an extract of similar properties, although inferior in flavor, to that from juices carefully prepared for the express purpose.

The preparation of the extract is as follows: I take recently caught cod-fish, salmon, scup, herring, menhaden, or any other edible and wholesome fish found in salt or fresh waters, and after cleaning the same I add water, and by cutting, mincing, or macerating them with the water, cold, or by boiling for a short period, I bring the juices to a condition in which they may be easily separated from the solid parts, and then strain or press the same in order to separate the liquid; or I take the watery liquid which is separated by draining or pressure, from herring, menhaden, or other fish which have been cooked for the purpose of obtaining the oil and chum or scrap contained therein.

As soon as the liquid obtained by either of the above methods has settled to a sufficient degree of clearness, I remove any scum or oil which may be on its surface, and dip it or draw it off into boilers or evaporating pans or basins, for the purpose of concentrating it by evaporation of a large proportion or all of the water contained therein.

The size, form, and construction of the evaporating-vessels may be like any of those commonly used for the concentration of watery liquids by evaporation—such, for instance, as saccharine or other vegetable juices—and the necessary heat may be applied directly by fire beneath the same, or by means of steam pipes or coils, or otherwise, as may be most convenient, and it may be either *in vacuo* or under ordinary atmospheric pressure.

I then proceed to evaporate the liquor as rapidly as practicable and convenient, carefully removing from time to time, as the concentration goes on, the scum which gradually forms and rises to the surface, continuing the evaporation until the thickening liquid attains a degree of concentration which admits of its being kept without injury for a satisfactory length of time, and this, for some purposes, I have found to be reached when the extract has attained a specific gravity of about 1.25, (that is to say, when it is about twenty-five hundredths heavier than pure water.) If this evaporation has been effected by direct heat, and it be desired to concentrate further, I transfer the liquid or semi-liquid extract of the strength above named to a suitable metallic vessel provided with a steam-jacket for the application of heat, and as a matter of convenience with a mechanical stirrer, for the purpose of keeping its contents in motion, and securing uniform consistency during further evaporation.

The product thus derived may be put up in cans, bottles, or other close vessels or packages, and may, in this way, be readily preserved for use.

Thus prepared and packed, the said extract will retain its flavor entire under any condition of heat or cold or climate.

What I claim as my invention, and desire to secure by Letters Patent, is—

The new article of food herein described, composed of a fluid or semi-fluid concentrated extract of fish, substantially as set forth.

In testimony that I claim the foregoing as my own I affix my signature in presence of two witnesses.

S. L. GOODALE.

Witnesses:
   CHARLES E. CLIFFORD,
   FRANK H. JORDAN.